July 31, 1928.  1,678,811
E. J. HALL
BUS BODY FRAME CONSTRUCTION
Filed April 29, 1927   2 Sheets-Sheet 2
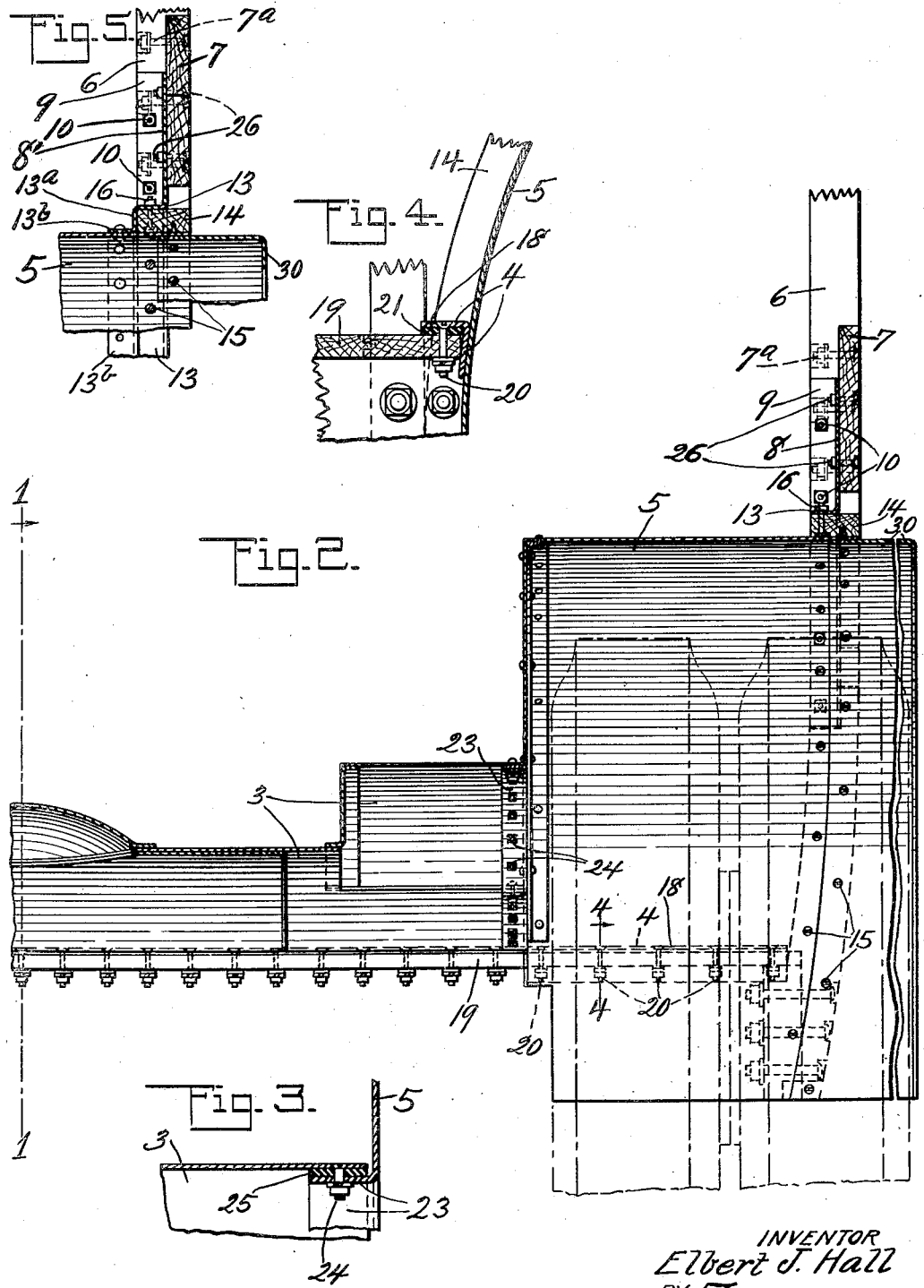

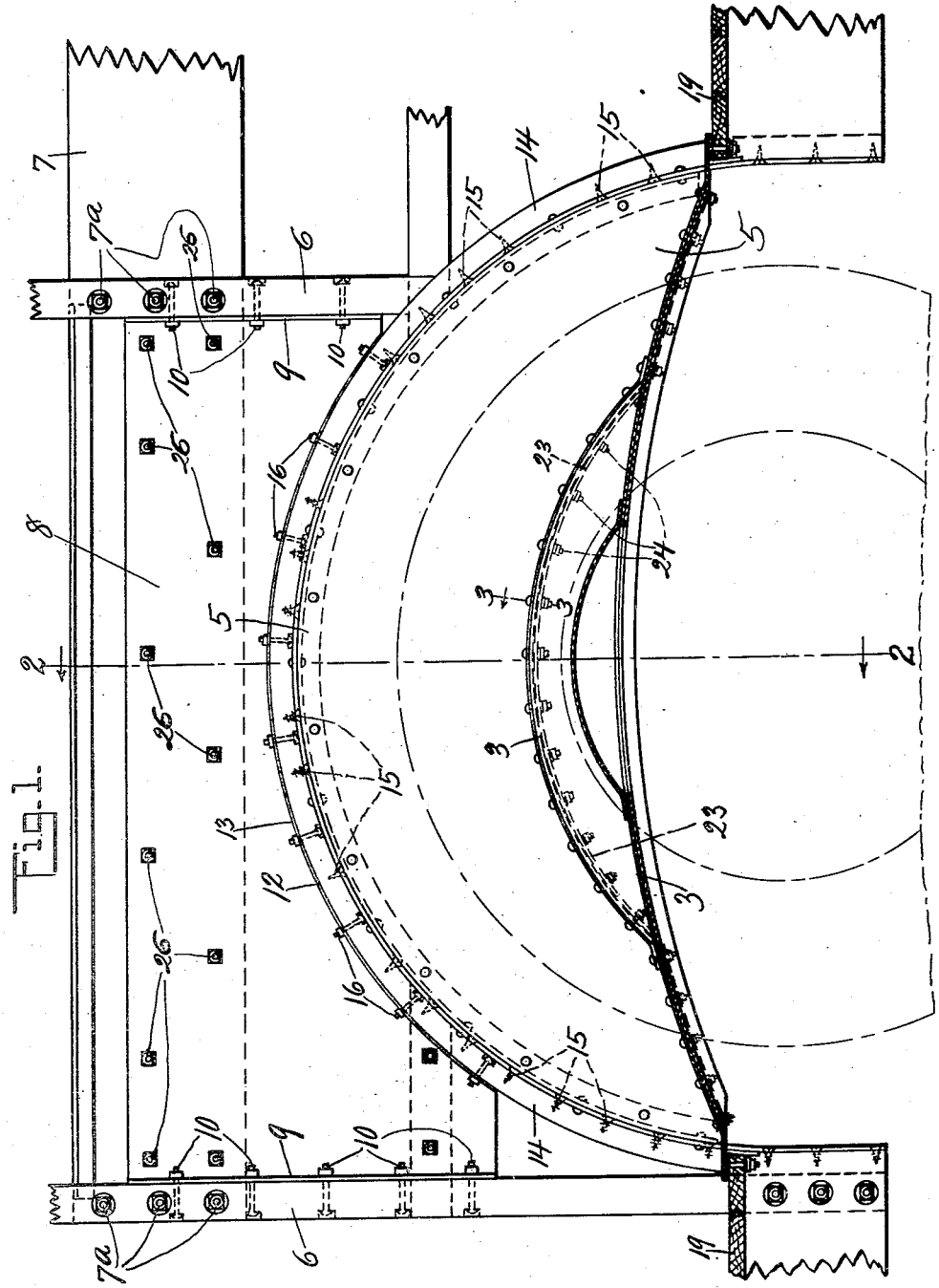

Patented July 31, 1928.

1,678,811

UNITED STATES PATENT OFFICE.

ELBERT J. HALL, OF DETROIT, MICHIGAN, ASSIGNOR TO AMERICAN CAR AND FOUNDRY MOTORS COMPANY, OF NEW YORK, N. Y., A CORPORATION OF DELAWARE.

BUS-BODY-FRAME CONSTRUCTION.

Application filed April 29, 1927. Serial No. 187,591.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a fragmentary longtiudinal vertical sectional view of a portion of the body of a motor bus;

Fig. 2 is a transverse sectional view of parts of the bus body structure shown in section on line 2—2 of Fig. 1;

Fig. 3 is a fragmentary sectional detail view taken on line 3—3 of Fig. 1;

Fig. 4 is a similar view taken on line 4—4 of Fig. 2, and

Fig. 5 illustrates a modification as taken on the section line 2—2 of Fig. 1.

This invention relates to motor vehicles and has particular reference to a bus body frame construction.

The invention has for its principal object the provision of means for obviating longitudinal shifting or weaving of the vehicle body with respect to its chassis frame.

More specifically, the invention contemplates interposing a longitudinal combined tie and bracing plate between the vertical body posts adjacent the wheel housing and connecting this plate to the posts and housing to prevent longitudinal shifting or weaving of the vehicle body with respect to the chassis frame.

Referring to the drawings in detail, and particularly to Figure 1, parts of a motor bus are illustrated including a wheel housing 5, a pair of vertical body posts 6, each of which is disposed adjacent one end of the wheel housing, a belt rail 7 which is attached to each of the body posts throughout the length of the body by bolts 7ª 7ª and an axle housing 3.

This invention contemplates bracing the vehicle body against longitudinal movement or weaving relative to the chassis frame, and to that end an elongated bracing and reinforcing plate 8 preferably of steel is interposed between the vertical body posts 6 next the wheel housing and at each end thereof said plate having vertical end flanges 9 lying parallel and against the inner faces of the posts 6 and being secured thereto by transverse bolts 10.

The lower edge of this plate 8 is cut out in the arc of a circle as at 12, to conform to the semi-circular contour of the wheel housing 5, and is formed with a laterally extending flange 13 extending longitudinally thereof. A semi-circular wood rail 14 is positioned on the wheel housing intermediate its front and rear faces and is secured thereto by fastenings 15. The longitudinally bowed flange 13 rests upon the upper face of the semi-circular rail 14 and is secured thereto by bolts 16 passing vertically through the rail and flange. With the plate 8 thus arranged and connected to the body posts 6 and wheel housing 5, the body will be effectively braced against longitudinal movement or weaving with respect to its chassis. The connection referred to is additionally reinforced by a direct connection of plate 8 to the belt rail 7, by means of the bolts 26 passing through both parts at convenient intervals.

The wheel housing 5 and axle housing 3 are connected to and rest upon the flooring of the vehicle by means of transversely extending flanges 4 secured to the floor by means of bolts 20. To eliminate noise between these flanges 18 and the flooring 19, a longitudinal strip of cushioning material 21, such as rubber, is interposed between each flange 18 and the upper face of the flooring 19, as best shown in Fig. 4.

Upon reference to Figure 2, it will be seen that the wheel housing 5 has its inner wall connected to the axle housing 3 by a lateral longitudinally bowed flange 23, lapping and being secured to the outer edge of the axle housing by bolts 24. A strip of cushioning material 25, such as rubber, is interposed between the flange 23 and the adjacent surface of the axle housing as shown in Fig. 3 to prevent noise between these parts.

In the modified construction illustrated in Fig. 5, the plate 8' replaces the plate 8 of the other views and is flanged inwardly at 13 as in Fig. 2. It is also flanged downwardly as at 13ª and again inwardly as at 13ᵇ, thereby affording a means of direct connection to the wheel housing 5 to which it is directly secured by rivets as shown in Fig. 5.

In this modification the bolts 16 may secure the rail 14 in position and the mud guard be secured to said rail as shown in Fig. 2, or the bolts 16 may secure the rail and mud guard 30 in position by passing through all these parts. It is obvious that the posts are connected directly to the belt rail and the bolts 7ª are provided for that purpose.

What is claimed is:

1. In combination, a wheel housing, a pair of vertical body posts adjacent the housing, a semi-circular rail attached to the upper face of the housing, a plate extending to and attached to the posts and having a flange resting upon and attached to the rail.

2. In combination in a vehicle, a wheel housing, body posts, a belt rail connecting said posts, a metallic reinforcing plate extending from one post to the next adjacent post and directly connected to the posts and belt rail.

3. In combination in a vehicle, a wheel housing, body posts, a belt rail connecting said posts, a metallic reinforcing plate extending from one post to the next adjacent post and directly connected to the posts, to the belt rail and also connected to the wheel housing.

4. In combination in a vehicle, a wheel housing, body posts, a belt rail connecting said posts and a flanged reinforcing plate connected through its flanges to the posts, belt rail and wheel housing.

5. In a motor vehicle, side posts, a wheel housing and means for reinforcing said posts comprising a straight metallic plate connecting said side posts from a point adjacent the upper portion of the wheel housing to a point a substantial distance above said housing, said plate resting upon and being secured to the housing.

In witness whereof I have hereunto set my hand.

ELBERT J. HALL.